United States Patent
Yamada et al.

(10) Patent No.: US 8,528,111 B2
(45) Date of Patent: Sep. 3, 2013

(54) METHOD FOR POSITIONING AN ATOMIC FORCE MICROSCOPY TIP IN A CELL

(75) Inventors: Nazumi Alice Yamada, San Jose, CA (US); Bo U. Curry, Redwood City, CA (US); Chriatian Rankl, Linz (AT)

(73) Assignee: Agilent Technologies, Inc., Santa Clara, CA (US)

( * ) Notice: Subject to any disclaimer, the term of this patent is extended or adjusted under 35 U.S.C. 154(b) by 246 days.

(21) Appl. No.: 13/176,689

(22) Filed: Jul. 5, 2011

(65) Prior Publication Data
US 2013/0014295 A1    Jan. 10, 2013

(51) Int. Cl.
*G01Q 30/02* (2010.01)
(52) U.S. Cl.
USPC .......... 850/9; 850/8; 850/21; 850/30; 850/31; 250/458.1; 250/461.1; 250/461.2
(58) Field of Classification Search
USPC ........ 850/8, 9, 21, 24, 30, 31, 33; 250/458.1, 250/459.1, 461.1, 461.2
See application file for complete search history.

(56) References Cited

U.S. PATENT DOCUMENTS

| 7,157,234 B2 | 1/2007 | Obremski et al. |
| 2011/0035848 A1 | 2/2011 | Perkins et al. |

FOREIGN PATENT DOCUMENTS

| JP | 07043372 | 2/1995 |
| JP | 08304420 | 11/1996 |

OTHER PUBLICATIONS

Chen, et al., "A cell nanoinjector based on carbon nanotubes", Proc Natl Acad Sci, 2007, 104:8218-22.
Cuerrier, et al., "Single cell transfection using plasmid decorated AFM probes", Biochem Biophys Res Commun, 2007, 355:632-6.
Lamontagne, et al., "AFM as a tool to probe and manipulate cellular processes", Pflugers Arch, 2008, 456:61-70.
Meister, et al., "FluidFM: combining atomic force microscopy and nanofluidics in a universal liquid delivery system for single cell applications and beyond", Nano Lett, 2009, 9:2501-7.
Nawarathna, et al., "Selective probing of mRNA expression levels within a living cell", Appl Phys Lett, 2009, 95:83117.
Osada, et al., "mRNA analysis of single living cells", J Nanobiotechnology, 2003, 1:2.

*Primary Examiner* — Robert Kim
*Assistant Examiner* — Hanway Chang

(57) ABSTRACT

A method for positioning a tip of an atomic force microscope relative to a intracellular target site in a cell is provided. In general terms, the method comprises: a) positioning a fluorescent tip of an atomic force microscope over a cell comprising a fluorescent intracellular target site so that said tip is above target site; b) moving the tip toward said target site while obtaining images of the distal end of said tip and/or the target site using a fluorescence microscope; and c) arresting the movement of the tip when the target site and the distal end of the tip are both in focus in the fluorescence microscope. A microscope system for performing the method is also provided.

20 Claims, 1 Drawing Sheet

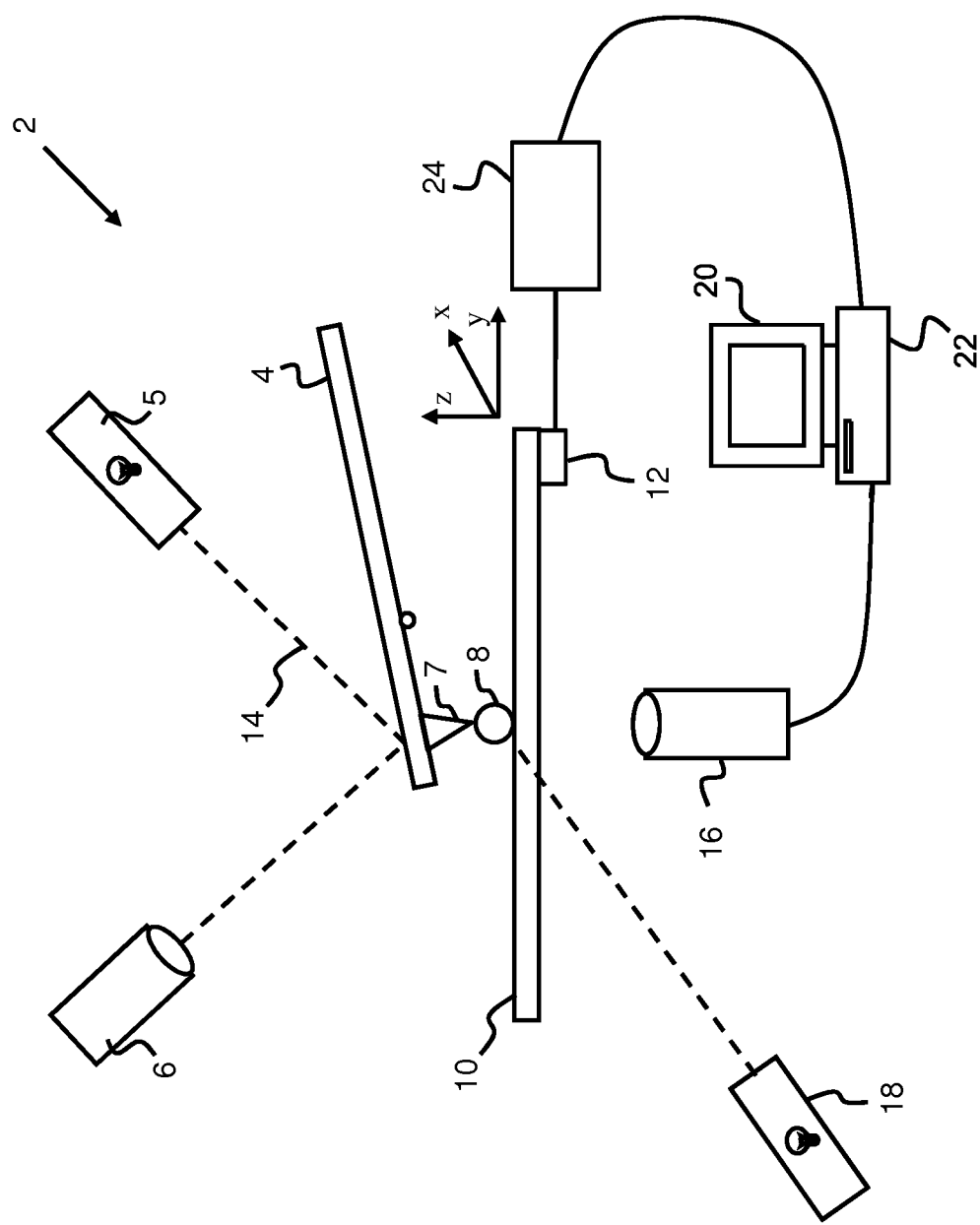

METHOD FOR POSITIONING AN ATOMIC FORCE MICROSCOPY TIP IN A CELL

INTRODUCTION

An atomic force microscope (AFM) contains a cantilever with a sharp tip (which may also be referred to as a probe) at its end that is used to scan and in certain applications penetrate a specimen surface. The cantilever is typically silicon or silicon nitride, and the tip has radius of curvature on the order of nanometers. When the tip is brought into proximity of a sample surface, forces between the tip and the sample lead to a deflection of the cantilever according to Hooke's law. Depending on the application, this force may be measured by detecting the deflection of the cantilever, e.g., using a laser spot reflected from the top surface of the cantilever into an array of photodiodes, although other methods are known. For example, in certain cases a cantilever may be fabricated to contain piezoresistive elements that act as a strain gauge. Using a Wheatstone bridge, strain in the AFM cantilever (due to deflection) can be measured.

SUMMARY

A method for positioning a tip of an atomic force microscope relative to a intracellular target site in a cell is provided. In general terms, the method comprises: a) positioning a fluorescent tip of an atomic force microscope over a cell comprising a fluorescent intracellular target site so that said tip is above said target site; b) moving the tip toward said target site while obtaining images of the distal end of said tip and/or the target site using a fluorescence microscope; and c) arresting the movement of the tip when the target site and the distal end of the tip are both in focus in the fluorescence microscope. A microscope system for performing the method is also provided.

BRIEF DESCRIPTION OF THE FIGURES

FIG. 1 schematically illustrates an exemplary system.

DESCRIPTION OF EXEMPLARY EMBODIMENTS

Before the present invention is described in greater detail, it is to be understood that this invention is not limited to particular embodiments described, and as such may, of course, vary. It is also to be understood that the terminology used herein is for the purpose of describing particular embodiments only, and is not intended to be limiting, since the scope of the present invention will be limited only by the appended claims.

Where a range of values is provided, it is understood that each intervening value, to the tenth of the unit of the lower limit unless the context clearly dictates otherwise, between the upper and lower limit of that range and any other stated or intervening value in that stated range is encompassed within the invention.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the present invention, the preferred methods and materials are now described.

All publications and patents cited in this specification are herein incorporated by reference as if each individual publication or patent were specifically and individually indicated to be incorporated by reference and are incorporated herein by reference to disclose and describe the methods and/or materials in connection with which the publications are cited. The citation of any publication is for its disclosure prior to the filing date and should not be construed as an admission that the present invention is not entitled to antedate such publication by virtue of prior invention. Further, the dates of publication provided may be different from the actual publication dates which may need to be independently confirmed.

It must be noted that as used herein and in the appended claims, the singular forms "a", "an", and "the" include plural referents unless the context clearly dictates otherwise. It is further noted that the claims may be drafted to exclude any optional element. As such, this statement is intended to serve as antecedent basis for use of such exclusive terminology as "solely," "only" and the like in connection with the recitation of claim elements, or use of a "negative" limitation.

As will be apparent to those of skill in the art upon reading this disclosure, each of the individual embodiments described and illustrated herein has discrete components and features which may be readily separated from or combined with the features of any of the other several embodiments without departing from the scope or spirit of the present invention. Any recited method can be carried out in the order of events recited or in any other order which is logically possible.

As used herein and unless indicated to the contrary, all terms that are used to indicate movement of one object relative to another object are intended to be relative terms in that when a first object is moved relative to a second object, the first object may be moved, the second object may be moved, or both objects may be moved. Further, terms such as "above", "below", "up" and "down" are not intended to imply a position relative to gravity.

The method may be generally employed in conjunction with a microscopy system such as that schematically illustrated in FIG. 1. Microscopy system 2 contains an atomic force microscope (composed of cantilever 4 and tip 7 as well as optional light source 5 (e.g., a laser) and optional detector 6). Cantilever 4 is positioned so that tip 7 is proximal to cell 8 that is present on sample plate 10, which may be, e.g., a transparent slide or other object that can hold a cell securely. The sample plate is held into place by holder 12, which has actuators that can facilitate movement of the sample plate in the x, y and z axes, where the x and y axes are planar to the sample plate, and the z axis is in a direction that is towards the tip of the probe. As illustrated, the force exerted on cantilever 4 may be measured by measuring the deflection of light beam 14, although other methods for measuring force are known. The system also contains fluorescence microscope 16, which is capable of detecting fluorescence emitted from tip 7 and cell 8. Fluorophores in tip 7 and cell 8 are excited by light source 18. As illustrated, the fluorescence microscope is connected to a computer 22 having optional display 20 for viewing fluorescence emitted from tip 7 and cell 8. The system may optionally contain a feedback control system 24, which can, for example, automatically move or maintain the sample plate and cantilever tip in a particular position in response to images that are obtained by fluorescence microscope 16. The elements described in FIG. 1 may be in alternative configurations.

In particular embodiments the microscope system comprises: a) an atomic force microscope comprising a fluorescent tip; b) a sample plate upon which a cell that comprises a fluorescent intracellular target site can be placed; and c) a fluorescence microscope, wherein the system is configured to automatically: a) move the fluorescent tip toward the sample plate after the tip has been positioned above the cell; and b) arrest the movement of the stage when the distal end of the tip and the fluorescent intracellular target site are both in focus in the fluorescence microscope. In certain cases the fluorescence microscope may be employed to position the tip in the x-y plane, above the cell. In particular embodiments the system is configured to actively maintain the positioning of the tip relative to the target site using a feedback control loop.

The system provides a way to "focus" an atomic force microscope tip to an intracellular target site (which may contain, e.g., biological molecules of interest) using fluorescence. In one embodiment, both the atomic force microscope tip and an intracellular target site are tagged with fluorophores. When viewed in the z-axis using a fluorescence microscope, i.e., from a position in which microscope, the fluorescent tip and the fluorescent intracellular target site are aligned, both the tip and the target site are only in focus when they are proximal to one another. In certain embodiments, target site and the distal end of the tip are in focus when they are within about 200 nm of one another (e.g., within about 100 nm of one another within or within about 50 nm of one another, depending on the desired result). Co-localization of the two fluorescent signals from the atomic force microscope tip and the intracellular target site in the cell ensures that the two are aligned directly in the same spatial orientation in all three axes.

In particular embodiments, the first positioning step may be done manually. In this step, the distal end of the tip may be positioned above the intracellular target site in the x-y plane, e.g., to within 200 nm, within about 100 nm or within about 50 nm, in the x-y plane. The sample plate may then be moved towards the tip in the z axis (by stepping or continuous motion). In particular embodiments, the force applied to the tip may be monitored during this step to determine when the tip penetrates a membrane of the cell, the plasma membrane or an internal membrane of the cell. The movement of the tip may arrested when the distal end of the tip and the target site are both in focus in the fluorescent microscope. In particular cases, the position of the tip relative to said target site may be maintained after the movement of the tip has been arrested. This positioning may be actively maintained using a feedback control loop. In particular cases, the fluorescence microscope is first focused on the intracellular target site, and an out-of-focus tip is moved into the cell until it becomes in focus. This may be done manually (e.g., by viewing an image in a monitor) or automatically (where a computer determines whether both the site and the tip are in focus).

What is deemed to be "in focus" may vary depending on the desired distance between the tip and the target site. In particular embodiments, the optics of the microscope may be altered to provide a desired depth of field which will determine the distance both the tip and the target site will become in focus. The detection of objects that are in focus may be automated using known methods, e.g., using passive autofocus methods. Autofocus methods include phase detection or contrast measurement methods, or methods that may be readily adapted from such known methods, for example.

An intracellular target site (e.g., an organelle or other structure in a cell) may be labeled fluorescently using a variety of methods. In one embodiment, a cell may be engineered to produce a fluorescent fusion protein. The fusion protein may in certain cases contain a targeting sequence that targets the protein to a site in the cell, e.g., the nucleus, endoplasmic reticulum, mitochondria or some other structure in the cell. If a fluorescent protein is used, the fluorescent protein may be a cyan fluorescent protein, a yellow fluorescent protein, a green fluorescent protein, a red fluorescent protein, a blue fluorescent protein, or any mutant thereof, including mutants of ECFP, EYFP, EGFP, ERFP, EBFP, obtained by enhancing the fluorescence intensity. Such reporter proteins may be derived from the fluorescent proteins of Aequorea, Discoma, Ptilosarcus, or Renilla GFP, for example, which proteins are well known.

In alternative embodiments, sites in a cell may be labeled using a fluorescently labeled binding partner, e.g., a fluorescently labeled oligonucleotide, antibody, or aptamer, methods for which are known. In other embodiments, a cell may be stained with a structure-specific stain, many of which are known.

The tip can be made fluorescent by, e.g., coupling fluorescent beads to the tip or by directly conjugating a fluorescent dye to the tip. The chemistry for coupling molecules to solid supports using, e.g., reactive amine, aldehyde, thiol, or epoxy groups, etc., is well known. In one embodiment, a tip may be first functionalized by covalently binding amino groups or other reactive groups to hydroxyl groups on the surface of the tip (e.g., using ethanolamine or 3-amiopropyltriethoxysilane), and then coupling the a dye, e.g., FITC, to the reactive group via, e.g., NHS chemistry. Pre-functionalized tips can be purchased from e.g., NanoAnd More (Germany), and exemplary chemistry that may be employed for functionalization is described in, e.g., Hinterdorfer et al (Proc. Natl. Acad. Sci. 2003 93, 3477-3481), Riener et al (Anal. Chim. Acta 2003 479, 59-75.) Riener et al (Anal. Chim. Acta 2003 497, 101-114), Klein (Chem. Phys. Chem. 2003 4, 1367-1371), Kamruzzahan, et al (Bioconjugate Chem. 2006 17, 1473-1481) and Ebner et al (Bioconjugate Chem. 2007 18, 1176-1184). In particular embodiments, only the apex (e.g., the distal 20-50 nm) of the tip is labeled. This may be done, e.g., by lowering the tip onto a substrate that has been coated with a thin layer of the fluorophore, and the tip should react only to the depth of the fluorophore on the substrate. In one embodiment, an AFM tip can react with a thin layer of reactive dye as it passes over the surface. In another embodiment, an entire amine-functionalized AFM tip reacted with NHS-biotin in a bulk reaction, and the substrate is coated non-covalently with a monolayer of fluorescent beads coated with streptavidin.

Suitable fluorescent dyes include: xanthene dyes, e.g. fluorescein and rhodamine dyes, such as fluorescein isothiocyanate (FITC), 6-carboxyfluorescein (commonly known by the abbreviations FAM and F),6-carboxy-2',4',7',4,7-hexachlorofluorescein (HEX), 6-carboxy-4',5'-dichloro-2',7'-dimethoxyfluorescein (JOE or J), N,N,N',N'-tetramethyl-6-carboxyrhodamine (TAMRA or T), 6-carboxy-X-rhodamine (ROX or R),5-carboxyrhodamine-6G (R6G$^5$ or G$^5$), 6-carboxyrhodamine-6G (R6G$^6$ or G$^6$), and rhodamine 110; cyanine dyes, e.g. Cy3, Cy5 and Cy7 dyes; coumarins, e.g umbelliferone; benzimide dyes, e.g. Hoechst 33258; phenanthridine dyes, e.g. Texas Red; ethidium dyes; acridine dyes; carbazole dyes; phenoxazine dyes; porphyrin dyes; polymethine dyes, e.g. cyanine dyes such as Cy3, Cy5, etc.; BODIPY dyes and quinoline dyes. Specific fluorophores of interest that are commonly used in subject applications include: Pyrene, Coumarin, Diethylaminocoumarin, FAM, Fluorescein Chlorotriazinyl, Fluorescein, R110, Eosin, JOE, R6G, Tetramethylrhodamine, TAMRA, Lissamine, ROX, Napthofluorescein, Texas Red, Napthofluorescein, Cy3, and Cy5, etc. In one embodiment, the tip should be labeled with a fluorophore that emits fluorescence at a wavelength that is distinguishable from the fluorescence of the intracellular target site. Many such combinations are known.

An atomic force microscope may be employed to manipulate the internal contents of a cell (e.g., to deposit materials into the interior of a cell or extract material from the interior a cell, or to move intracellular components within a cell). Examples of such methods are described in, e.g., Chen et al (Proc. Natl. Acad. Sci 2007 103: 8218-8222), Cuerrier et al (Biochem. Biophys. Res. Comm. 2007 355: 632-636), Nawarathna et al (Appl. Physics Lett. 2009 95: 083117), Lamontagne et al (Eur. J. Physiol. 2008 456: 61-70), Meister et al (Nano. Lett. 2009 9: 2501-2507) and Osada et al (J. Nanobiotechnology 2003 1:2-9), which references are incorporated herein by reference for all purposes, particularly for disclosure of applications to which AFM can be applied.

In one embodiment, the method may include depositing a material from the tip at a position proximal to the target site, after the movement of the tip has arrested. In these embodiments, in addition to being fluorescent, the tip may be modified to contain a material, e.g., an oligonucleotide, a protein (e.g., an antibody) or another molecule that can be inducibly released from the tip into the cell in response to a stimulus (e.g., uv light, etc.). After the material has been deposited the cell can be observed, e.g., for a change in phenotype. In another embodiment, the method may include removing a material the target site, after the movement of the tip has been arrested. In these embodiments, the removed material may be nucleic acid (e.g., RNA or DNA) or protein, for example. The removed material may be analyzed after the material has been removed. In some embodiments, the cell may be observed to determine whether the removal of the material causes a phenotype. In certain embodiments, the tip may be withdrawn from the cell Cell manipulation methods often require correct positioning of the tip of the atomic force microscope in the z-axis, especially in relation to a target site in the cell. The method described above is believed to be superior to current methods that simply move an atomic force microscope tip to a predetermined position in the Z-axis that is measured relative to a fixed position on the device. However, the z-axis position of the target site may vary from cell to cell, and, as such, the prior methods may provide variable results.

All publications and patent applications cited in this specification are herein incorporated by reference as if each individual publication or patent application were specifically and individually indicated to be incorporated by reference. The citation of any publication is for its disclosure prior to the filing date and should not be construed as an admission that the present invention is not entitled to antedate such publication by virtue of prior invention.

Although the foregoing invention has been described in some detail by way of illustration and example for purposes of clarity of understanding, it is readily apparent to those of ordinary skill in the art in light of the teachings of this invention that certain changes and modifications may be made thereto without departing from the spirit or scope of the appended claims.

What is claimed is:

1. A method for positioning a tip of an atomic force microscope relative to a intracellular target site in a cell, comprising:
    a) positioning a fluorescent tip of an atomic force microscope over a cell comprising a fluorescent intracellular target site so that said tip is above target site;
    b) moving said tip toward said target site while obtaining images of the distal end of said tip and/or said target site using a fluorescence microscope; and
    c) arresting the movement of said tip when said target site and the distal end of said tip are both in focus in said fluorescence microscope.

2. The method of claim 1, wherein said target site and the distal end of said tip are in focus when they are within 100 nm of one another.

3. The method of claim 1, wherein the positioning of said tip relative to said target site is maintained after said arresting.

4. The method of claim 3, wherein said positioning is actively maintained using a feedback control loop.

5. The method of claim 1, wherein said tip emits fluorescence at a wavelength that is distinguishable from the fluorescence of said fluorescent intracellular target site.

6. The method of claim 1, wherein target site comprises a fluorescent protein.

7. The method of claim 1, wherein said target site is labeled with a labeled binding partner.

8. The method of claim 1, wherein said labeled binding partner is a labeled oligonucleotide, antibody or aptamer.

9. The method of claim 1, wherein said cell is stained with a fluorescent dye.

10. The method of claim 1, further comprising monitoring atomic force during said moving step to determine when said tip penetrates a membrane of said cell.

11. The method of claim 1, further comprising, after said arresting step, depositing a material from said tip at a position proximal to said target site.

12. The method of claim 11, wherein said material comprises an oligonucleotide, a small molecules or a protein.

13. The method of claim 11, further comprising observing said cell after said material has been deposited.

14. The method of claim 1, after said arresting step, removing material from a position proximal to said target site using said tip.

15. The method of claim 14, wherein said material is nucleic acid or protein.

16. The method of claim 14, further comprising analyzing said material after it has been removed from said cell.

17. The method of claim 1, wherein positioning step a) is done manually.

18. A microscope system comprising:
    a) an atomic force microscope comprising a fluorescent tip;
    b) a sample plate for placement of a cell that comprises a fluorescent intracellular target site; and
    c) a fluorescence microscope;
    wherein said system is configured to automatically: a) move said fluorescent tip toward said sample plate after said tip has been positioned above said cell; and b) arrest the movement of said sample plate when the distal end of said tip and said fluorescent intracellular target site are both in focus in said fluorescence microscope.

19. The microscope system of claim 18, further comprising an optical microscope for positioning said tip above said cell.

20. The microscope system of claim 18, wherein said system is configured to actively maintain the positioning the tip and relative to the target site using a feedback control loop.

* * * * *